United States Patent Office.

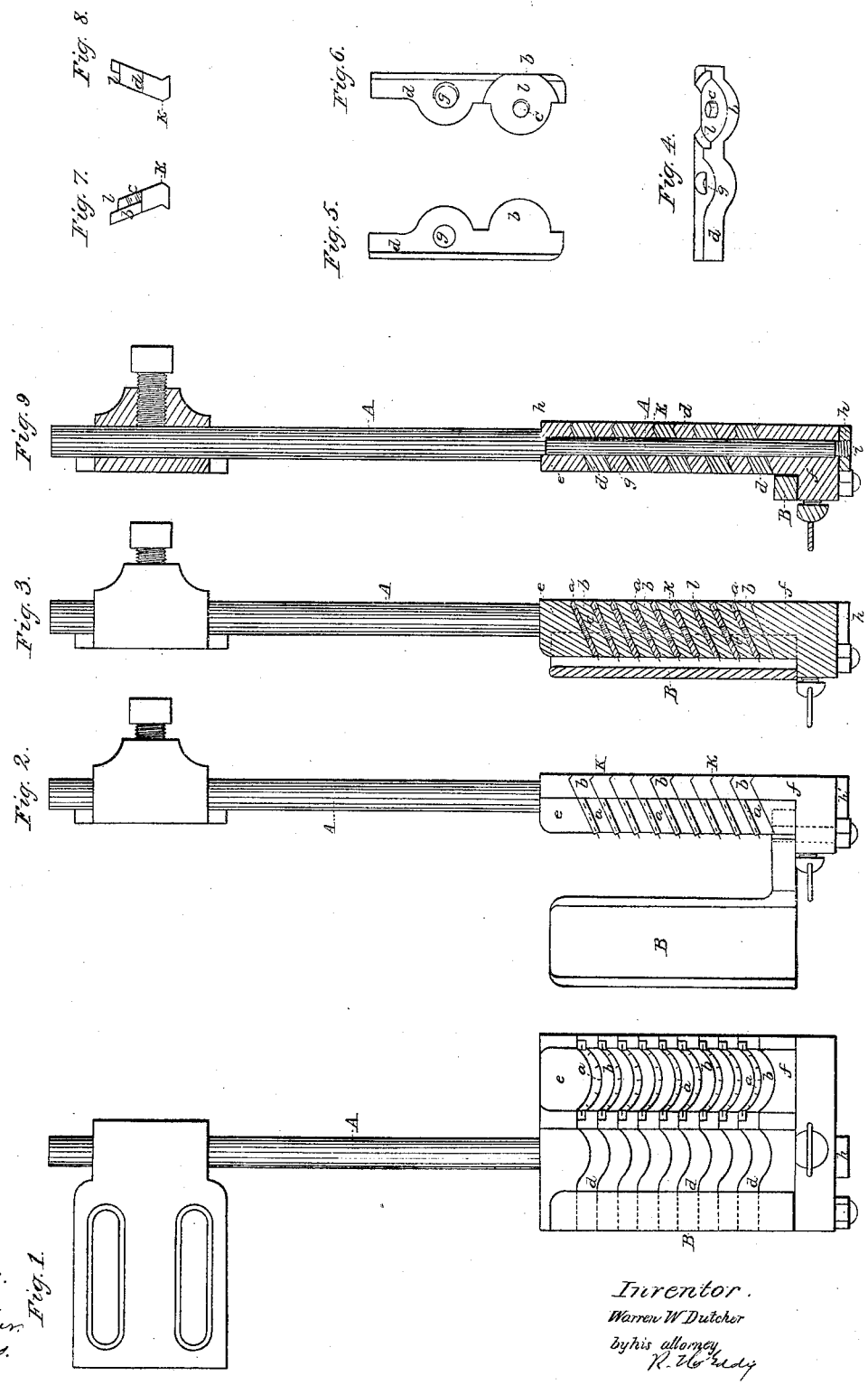

WARREN W. DUTCHER, OF MILFORD, MASSACHUSETTS.

Letters Patent No. 63,372, dated April 2, 1867.

IMPROVEMENT IN LOOM TEMPLES.

The Schedule referred to in these Letters Patent and making part of the same.

TO ALL PERSONS TO WHOM THESE PRESENTS SHALL COME:

Be it known that I, WARREN W. DUTCHER, of Milford, in the county of Worcester, and State of Massachusetts, have made a new and useful invention having reference to Loom Temples; and I do hereby declare the same to be fully described in the following specification, and represented in the accompanying drawings, of which—

Figure 1 is a top view of one of my improved toothed-wheel temples and its supporting-rod.
Figure 2 is a front elevation of it.
Figure 3 is a vertical section taken through its toothed wheels.
Figure 9 is a section of the temple taken through the supporting-rod, and in line of its axis.

In figs. 1 and 2 the cap of the temple is exhibited as thrown backward or off the temple. The temple on which my improvement is based is that described in Letters Patent of the United States of America, No. 54,269, granted April 24, A. D. 1866, to H. Kayser, assignee of J. Mathis.

In carrying out my invention I have provided for a better means of supporting the series of oblique wheels employed in the formation of the said patented temple, that is to say, I have combined with each of the sustaining disks of such wheels an arm to extend therefrom. Each of such arms, as well as the end supporters of the series, I form so that one may interlay or interlock with, or extend into or receive that next to it, and I also make it with a hole or passage for reception of a rod for supporting the series of arms.

In the drawings, $a\ a\ a$ denote the series of toothed wheels, arranged parallel to each other but oblique to a common imaginary axis, and in a carrier composed of a series of disks or plates, $b\ b\ b$, similarly arranged. Each of the wheels is supported by, and so as to be capable of being freely revolved on, a journal, $c$, extending from one of the disks next to it. From each disk an arm, $d$, projects horizontally. The several disks and arms are arranged between end-supporters, $e\ f$, which, with the disks, are formed with holes, $g$, going through the series in a straight line, and forming a continuous passage for the reception of a rod, A, provided with a tenoned shoulder, $h$, for one of the end-supporters to rest against. Where the said rod projects beyond the other end-supporter, it is provided with a screw, $i$, to receive a nut, $h'$. The several arms are arranged obliquely on the rod, each of them being extended into, or made to receive the next one, in manner substantially as represented at $k\ k$, &c., in the drawings, in order that each two next adjacent arms may mutually support each other in their common plane of arrangement. Each external arm of the series is similarly connected with, or supported by, the next end-supporter. The temple cap, exhibited at B, is to be made and applied to the temple in the usual manner. Each of the disks is recessed for reception of a toothed wheel, the said disk with its perforated arm being exhibited in top view in fig. 4, in side elevations in figs. 5 and 6, and in end views in figs. 7 and 8. The wheel-receiving recess is shown at $l$.

I do not claim a loom temple composed of a series of toothed wheels arranged as represented in the aforementioned patent. Nor do I claim the carrier of such toothed wheels, as composed of several separate disks or sections provided with journals, and also with clamp-pin passages eccentric to, and extending through, such journals, the whole being as represented in such patent.

What I claim as my improvement, is—

The combination, as well as the arrangement, of the disks or series of sections, $b$, with a series of arms, $d$, to extend from them substantially in manner and for the purpose of supporting them when together, or in their proper relations to each other and the toothed wheels, as set forth.

I also claim the application of each arm or wheel-carrier section to that or the end-support next to it, so that they shall so interlay or interlock with and support one another, as to prevent one from being revolved or turned on their connection-rod independently of the other, when they are close together thereon, as described.

I also claim each of the said arms, as constructed with the aperture for receiving the supporting-rod.

I also claim the arrangement of the supporting-rod with respect to the arms and the end-supporters, viz, so as to go through all of them, and aid in fastening them together, as explained.

I also claim each disk or divisional plate, as made with a wheel-receiving recess $l$, and journal $c$, arranged in it as set forth.

WARREN W. DUTCHER.

Witnesses:
R. H. EDDY,
F. P. HALE, Jr.